United States Patent
Janelid et al.

[11] 3,934,420
[45] Jan. 27, 1976

[54] METHOD OF SEALING THE ROCK AROUND A ROCK CHAMBER INTENDED FOR A MEDIUM, THE TEMPERATURE OF WHICH IS BELOW THE NATURAL TEMPERATURE OF THE ROCK

[76] Inventors: Erik Ingvar Janelid, Forsetevagen 18, Djursholm; Carl-Olof Oskar Morfeldt, Friggavagen 17, Lidingo, both of Sweden

[22] Filed: July 11, 1974

[21] Appl. No.: 487,763

[30] Foreign Application Priority Data
Aug. 6, 1973    Sweden .............................. 7310782

[52] U.S. Cl. ........................................ 61/.5; 61/36
[51] Int. Cl.². B65G 5/00; E21F 17/16; E21B 33/13
[58] Field of Search ....................... 61/.5, 35, 36, 39

[56] References Cited
UNITED STATES PATENTS

| | | | |
|---|---|---|---|
| 528,367 | 10/1894 | Harris | 61/36 R |
| 2,928,247 | 3/1960 | Hubbell | 61/.5 |
| 2,932,170 | 4/1960 | Patterson et al. | 61/.5 |
| 2,947,146 | 8/1960 | Loofbourow | 61/36 R |
| 3,026,096 | 3/1962 | Love | 61/36 R X |
| 3,058,316 | 10/1962 | Toche | 61/.5 UX |
| 3,063,246 | 11/1962 | Dougherty | 61/.5 |
| 3,094,846 | 6/1963 | Peeler | 61/36 R |
| 3,468,129 | 9/1969 | Knutson | 61/36 R X |
| 3,649,574 | 3/1972 | Cole | 61/36 R X |
| 3,667,236 | 6/1972 | Rosene | 61/11 |

FOREIGN PATENTS OR APPLICATIONS

| | | | |
|---|---|---|---|
| 225,620 | 1/1963 | Austria | 61/.5 |
| 117,212 | 9/1946 | Sweden | 61/.5 |

*Primary Examiner*—Dennis L. Taylor
*Attorney, Agent, or Firm*—Toren, McGeady and Stanger

[57] ABSTRACT

Rock chambers are used for storing liquids and gases, e.g. natural gas, at low temperatures. To prevent leakage through cracks in the rock surrounding the rock chamber the invention provides a method of sealing the rock by injecting a sealing agent through drill holes in the rock. The sealing agent solidifies owing to the lower temperature of the rock and/or stored medium. The injection is continued as long as the cracks change owing to changes of temperature. Some of the drill holes or parts thereof are placed outside the zone where the sealing agent solidifies.

11 Claims, 2 Drawing Figures

METHOD OF SEALING THE ROCK AROUND A ROCK CHAMBER INTENDED FOR A MEDIUM, THE TEMPERATURE OF WHICH IS BELOW THE NATURAL TEMPERATURE OF THE ROCK

The present invention relates to a method of sealing rock around a rock chamber which is arranged in the rock. The invention particularly relates to sealing rock around rock chambers, intended for storing a medium whose temperature is considerably below the natural temperature of the rock, particularly a medium which is colder than −40°.

Rock chambers are used to an increasing extent for storing liquids and gases at low temperatures, down to almost −260°C. Normal bed-rock temperature varies within reasonable depths from +5° to +30°. Thus, there is a large difference in temperature between the rock layer nearest the rock chamber and the layers situated further away.

As no bedrock is faultless at normal temperatures but always flawed by more or less open cracks or faults, the rock around the rock chamber has to be sealed; this can be done according to conventional techniques by injecting cement into the rock, thereby filling the cracks and holes with cement.

For certain rock chambers situated near the surface the injecting can be carried out through long holes from the surface of the rock before blasting out the rock chamber, i.e. pre-injection. Pre-injection may also be carried out for deep-lying chambers in conjunction with the blasting, so that the blasting face is gradually sealed by pre-injecting or from tunnels round the planned rock chamber. It is, however, often impossible to seal rock chambers until they have been blasted out (after injection). Holes are then drilled from the inside of the rock chamber transverse to the planes of the cracks or from galleries outside the chamber.

When after-injecting, however, the compound which is injected may sometimes be forced out of the faces of the cracks in the chamber walls, which makes it difficult if not impossible to completely fill the cracks.

When cold media are introduced into the rock chamber, the rock shrinks. In these cases sealing in advance is thus not possible, as the thermo cracks have not yet been formed. It is thus only possible to seal the rock when the rock has re-stabilized after the change of temperature, i.e. when the temperature stresses have disappeared. At low temperatures and low stresses in the surrounding rock the rock will then have cracked and will allow gas and liquid to penetrate it.

In order to seal a rock chamber which cannot be entered, it is necessary to seal by injecting through holes drilled in the rock outside the actual rock chamber. There is then a risk that the injecting compounds will flow out into the rock chamber, as mentioned above, and cannot be contained.

The sealing problem is especially complicated when very cold media are to be stored. The contraction of the rock spreads as the cold face moves from the rock chamber out into the rock, forming new cracks and widening existing ones. As the refrigerating medium apreads in the cracks thus formed, the cooling process is accelerated and the cracks become both wider and longer until vaporization, i.e. the transfer of liquid medium into gas phase may become so great that storage is rendered impossible.

Consequently it has been necessary to abandon certain rock chambers in which it was planned to store media at temperature of lower than −40°C.

The present invention makes it possible to seal the cracks which are formed, widened or lengthened during cooling, in order to prevent the medium from penetrating into the rock and stop further cracking.

The method according to the invention is characterized in injecting a sealing agent which solidifies because of the different temperature of the rock and/or medium, in continuing to inject the sealing agent into the cracks as long as they are developing to any appreciable extent because of changes in temperature within the sealing zone and in placing the drill holes so that at least some of them or some parts of the drill holes are outside the zone where the sealing agent solidifies during the injection period.

The rock nearest the rock chamber will contain solidified sealing agent. It is important that this inner zone is surrounded by an outer zone in which the cracks contain liquid sealing agent, so that if a new crack should develop through the inner zone, the medium flowing through this crack will meet liquid sealing agent, which will then solidify and seal the crack. In order to maintain an outer zone of liquid sealing agent it is important to ensure that at least some of the drill holes through which the sealing agent is supplied do not become plugged with solidified sealing agent. Drill holes may, for example, be provided at various distances from thr rock chamber so that the most distant ones are far enough away from the rock chamber to avoid any risk of the sealing agent solidifying. Alternatively, the drill holes may be bored straight towards or diagonally towards the rock chamber, and may be made so long that the outer part of each drill hole will certainly contain liquid sealing agent.

The injection of sealing agent into the rock is preferably started more or less at the same time as the rock chamber is filled with the cold or hot medium. If the injection were to be started earlier, there would be a risk of losing large quantities of sealing agent, as the sealing agent may run into the rock chamber through open cracks in the rock. If the injection is started later there is a risk of losing a considerable amount of the cold or hot medium. The injection of the sealing agent into the rock should then be continued until the rock around the rock chamber has almost reached a state of equilibrium. At this point the formation of cracks due to temperature stresses will have ceased. If the rock is of the kind in which cracks are not likely to form for other reasons, the injection of sealing agent may now be discontinued.

The sealing agent will solidify by freezing when meeting the cold medium or rock which has been cooled by the cold medium. The smaller the difference between the temperature of the cold medium and the freezing point of the sealing agent, the narrower the zone of rock which will be sealed. A sealing agent is preferably used whose freezing point differs by at most 100°C, preferably at most 60°C, from the temperature of the cold medium. In rock chambers for storing liquid natural gas under pressure, for example at −120°C, a sealing agent with a freezing point within the interval from −60° to −130°C is preferably used.

The sealing agent may consist of an organic liquid which if desired, may possibly be introduced into the rock in vapour form. The liquid should preferably be non-toxic and immiscible with water. The liquid should also preferably be incombustible and have a high flashpoint. Preferred liquids are hydrocarbons, chlorinated hydrocarbons, and esters and ketones having a molecule with a large hydrocarbon part. The following examples of useful liquids and their melting points are mentioned:

| | |
|---|---|
| Dimethylformamide | −60°C |
| Amyl acetate | −71°C |
| Ethyl acetate | −84°C |
| n-Heptane | −91°C |
| Vinyl acetate | −93°C |
| Methanol | −94°C |
| Hexane | −95°C |
| Methylene chloride | −95°C |
| Toluene | −95°C |
| Ethanol | −117°C |
| Acetaldehyde | −121°C |
| Propanol | −126°C |
| Pentane | −130°C |

In practising the invention the rock around the rock chamber is preferably cooled, before storing the medium, to a temperature which is lower than the working temperature by means of a different refrigerating medium from that which is to be stored, e.g. liquid nitrogen, which has a boiling point of −196°C. The auxiliary cooling of the rock will further widen the cracks which have formed, and it will be easier to inject the sealing agent. When the temperature of the rock then rises to the temperature of the stored medium, a better sealing will be obtained as the rock expands again. The lower the temperature is, the better the sealing will be.

The method according to the invention may be combined with cooling the rock surrounding the proposed rock chamber before blasting out the rock chamber. This cooling may be carried out in a known manner, e.g. by introducing liquid nitrogen into drill holes. By this cooling the rock shrinks, existing cracks are widened and new cracks are formed. A sealing agent with a suitable freezing point according to the specification above may then be forced into the cracks and a sealed zone will be obtained around the planned chamber. The cooling should take place to a temperature corresponding to or preferably lower than the temperature which will be reached in the zone when stable conditions have been attained after starting to store the cold medium. Any new shrinkage cracks which may have formed from the walls of the cold storage chamber terminate when they reach the previously cooled and injected zone.

Several of the liquids mentioned above are fairly expensive and should thus only be used in rocks with fine cracks where little is needed. Most of the abovementioned liquids are soluble in liquid natural gas but may nevertheless be used as sealing agent for liquid natural gas because the temperature is low and the contact surfaces between the natural gas and the sealing agent are small.

It has proved suitable to use a type of sealing agent the viscosity of which increases when it cools. Many of the above-mentioned organic liquids are of this kind. Alternatively, such sealing agents may be prepared by dissolving a polymer in a solvent, preferably in an amount of 25 – 100 grams per liter of solvent. The solution will get a freezing point near the freezing point of the pure solvent. As examples of polymers which are soluble in aliphatic hydrocarbons may be mentioned the following: polyisobutene, polybutadiene, polyisoprene, natural rubber, styrene-butadiene rubber (SBR) and phenolic resin (novolac). Polymers which are not soluble in aliphatic hydrocarbons are, for example, cellulose acetate, polyvinyl alcohol, polyvenyl acetate (PVAc), polystyrene, polyvinyl chloride (PVC) and polymethyl metacrylate (PMMA). A few examples of useful combinations of polymer and solvent for various freezing point intervals are mentioned below:

POLYMER - SOLVENT SYSTEM

1. Polymers, which are soluble in aliphatic hydrocarbons

| Temperature interval °C | System |
|---|---|
| −60 − −70 | SBR - chloroform |
| −70 − −80 | polyisobutene - butyl acetate |
| −80 − −90 | SBR - ethyl acetate |
| −90 − −100 | polyisoprene - toluene natural rubber - hexane |
| −100 − −110 | polyisoprene - 1,2-dichloro-propane |
| −110 − −120 | polyisobutene - carbon disulfide |
| −120 − −130 | natural rubber - pentane |

2. Polymers which are insoluble in aliphatic hydrocarbons

| Temperature interval °C | System |
|---|---|
| −60 − −70 | polystyrene - chloroform |
| −70 − −80 | polystyrene - butyl acetate |
| −80 − −90 | PVC - methyl ethyl ketone |
| −90 − −100 | cellulose acetate - methyl acetate polystyrene - toluene |
| −100 − −110 | polystyrene - 1,2-dichloro propane |
| −110 − −120 | polystyrene - carbon disulfide |

If there are water-bearing cracks in the rock, the water will freeze during the cooling to ice which per se provides a certain sealing, but makes it more difficult for the sealing agent to penetrate. In certain cases it is therefore advisable first to inject a low-freezing liquid, e.g. the solvent used in the viscous sealing agent, and thus displace the water which would otherwise freeze when the rock is cooled. The solvent is later displaced by the sealing agent.

The sealing agent may also be changed during the cooling period in different freezing-points, e.g. stages at −100°, −60°, −40°, 0°C. In this case several rows of drill holes should be provided outside the walls of the rock chamber.

In the following the invention will be further explained with reference to the attached drawings.

Figure 1:
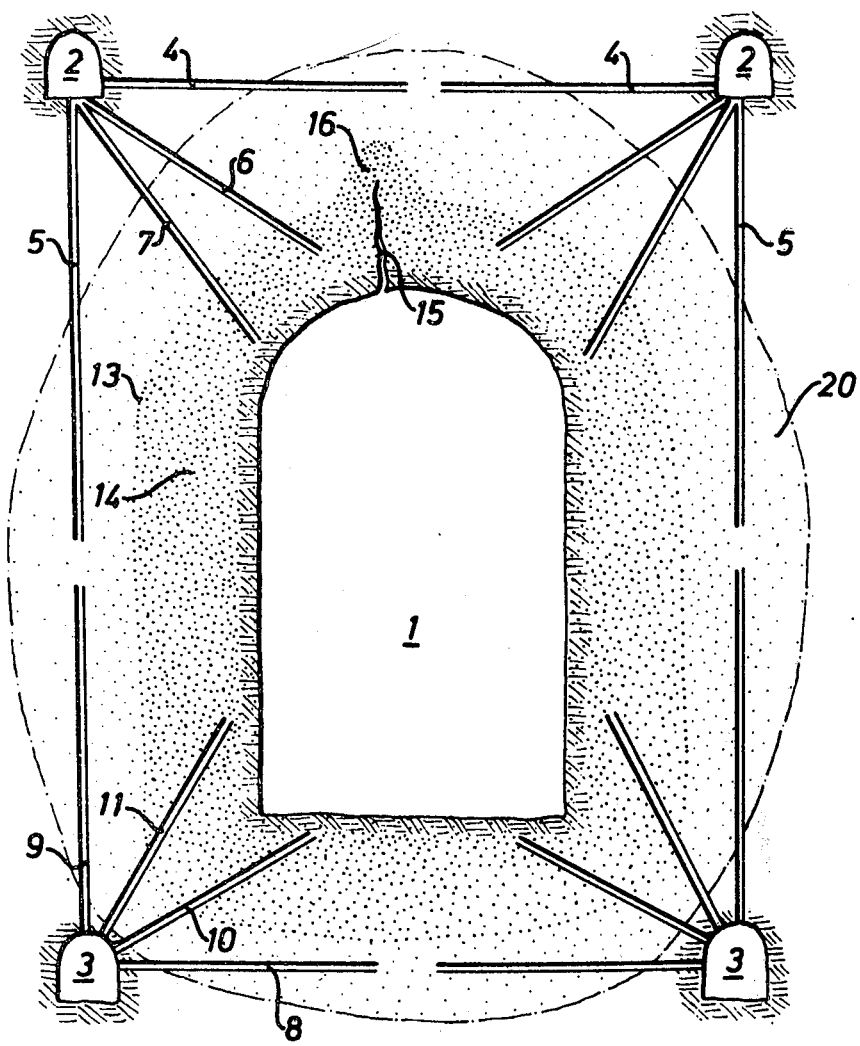
FIG. 1 shows a vertical cut through a rock chamber and the surrounding rock.

According to FIG. 1 four galleries have been cut outside a rock chamber 1 for liquid natural gas, two galleries 2 outside and above the rock chamber and two galleries 3 outside and below the rock chamber. Horizontal drillings 4, vertical drillings 5 and drillings 6, 7, diagonally inwards and downwards towards the rock chamber, have been made from galleries 2. From galleries 3 drill holes 8 – 11 have been bored in a similar manner. Other such drill holes have also been provided outside the end walls of the rock chamber.

The galleries 3 may also be placed approximately at the same level as the bottom of the rock chamber or be replaced by adjacent rock chambers, in which case the drillings are made diagonally downwards.

A liquid sealing agent is pumped through the drill holes and penetrates and fills cracks (not shown) in the rock. Around the whole rock chamber an inner zone 14 is formed in which the sealing agent is in solid form and seales the cracks in the rock to prevent the medium from leaking out of the rock chamber. An outer zone 20 is also formed, in which the sealing agent is in liquid form. If a crack 15 should break through zone 14, cold natural gas will penetrate through the crack in contact with liquid sealing agent in the outer zone 20. This liquid sealing agent will then solidify and form a local sealing area 16, which prevents leakage. If the liquid natural gas under pressure has a temperature of −120°C the isotherm for −90°C will follow the dotted line 13 when temperature equilibrium has been obtained. If the sealing agent has a melting point of −90°C, the −90°C isotherm will form the outer limit for zone 14. The inner limit for zone 14 may be at the wall of the rock chamber or it may, as shown in FIG. 1, be at a distance from the wall of the rock chamber because the forcing of sealing agent into the rock will not have begun until a small zone of the rock nearest to the rock chamber has been cooled to a temperature below −90°C. Galleries 2, 3 have been placed so that they will certainly lie outside the zone 14. Drill holes 4, 5, 8, 9 are all outside the zone 14, whilst holes 6, 7, 10, 11 are partly inside and partly outside zone 14. There are thus drill holes or parts of drill holes in which the sealing agent is not frozen and it can thus be guaranteed that there will be a zone 20 of liquid sealing agent outside zone 14 of frozen sealing agent. The drill holes should be placed so close together that the outer zone 20 of liquid sealing agent forms a continuous zone surrounding zone 14.

Figure 2:
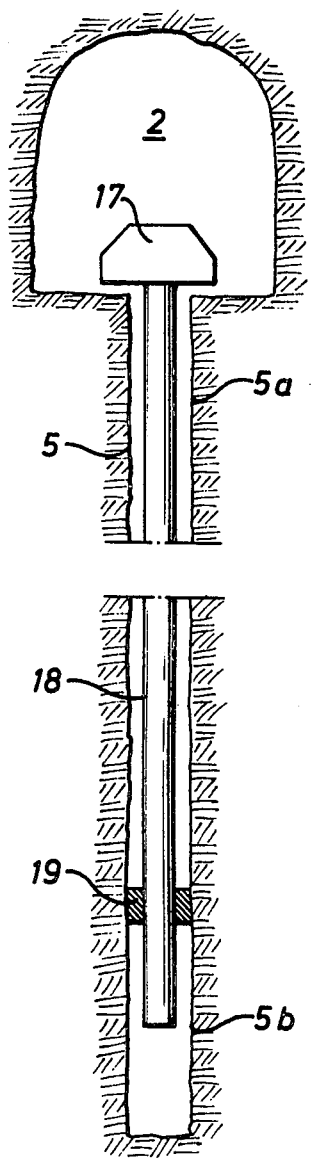
FIG. 2 shows a drillhole with means for supplying sealing agent to the rock.

FIG. 2 shows how liquid sealing agent is preferably introduced into the drill holes. From gallery 2 a tube 18 has been inserted into the vertical drill hole 5. A pump 17 for the sealing agent has been connected to the upper end of the tube. Near the lower end of the tube a sealing plug 19 has been provided in order to seal the gap between the tube 18 and the wall of the drill hole. Liquid sealing agent will thus be forced into the cracks in the rock from the lower part 5b of the drill hole 5 but not from the upper part 5a.

What we claim is:

1. A method for sealing a chamber surrounded by rock to adapt said chamber to store therein a substance having a predetermined storage temperature lower than the natural temperature of said rock comprising the steps of injecting into said surrounding rock a sealing agent having a melting point not more than about 100°C higher than said storage temperature of said substance, bringing the temperature within said chamber to below the melting point of said sealing agent substantially simultaneously with commencement of injection of said sealing agent into said surrounding rock, and continuing injection of said sealing agent to form about said chamber and within said surrounding rock a layer of frozen sealing agent contiguous with said chamber and a liquid layer of said sealing agent extending about said frozen layer.

2. A method according to claim 1 wherein said sealing agent is selected to have a melting point not more than 60°C above said storage temperature.

3. A method according to claim 1 wherein said sealing agent is a nonaqueous organic substance including a polymer.

4. A method according to claim 1 wherein said bringing of the temperature within said chamber to below the melting point of said sealing agent is performed by injecting into said chamber substantially simultaneously with said injecting of said sealing agent said substance to be stored at a temperature below the melting point of said sealing agent.

5. A method according to claim 1 including the step of forming a plurality of drill holes in said surrounding rock, said injecting of said sealing agent being performed by passing said sealing agent through said drill holes, with at least one of said drill holes extending within said surrounding rock completely within a portion of said rock where said liquid layer of said sealing agent is formed.

6. A method according to claim 1 wherein during said injection of said sealing agent the temperature of said chamber is brought to a temperature which is lower than the storage temperature of said substance.

7. A method according to claim 1 including the step of blasting out of rock to form said chamber after injecting of said sealing medium and after bringing of the temperature at which said chamber is formed to below the melting point of said sealing agent.

8. A method according to claim 1 including the step of introducing into said surrounding rock a substance which is liquid at said storage temperature prior to injection of said sealing agent in order to displace subsoil water.

9. A method according to claim 1 wherein said substance to be stored is liquid natural gas and wherein said sealing agent is an organic liquid having a melting point which is between about 60°–100°C higher than the storage temperature of said liquid natural gas.

10. A method according to claim 9, characterized in that the sealing agent is a hydrocarbon, a chlorinated hydrocarbon or an ester or ketone having a molecule with a large hydrocarbon part.

11. A method according to claim 1 wherein said sealing agent includes a polymer dissolved therein in an amount of about 25–100 grams polymer per liter of said sealing agent.

* * * * *